United States Patent

Wömpner et al.

[11] Patent Number: 5,836,190
[45] Date of Patent: Nov. 17, 1998

[54] PROCESS FOR EXTRUDING A SECTION OR THE LIKE FROM AN INGOT AND A DEVICE THAT PURPOSE

[75] Inventors: Diethelm Wömpner, Bodman-Ludwigshafen; Adolf Ames, Hilzingen-Duchtlingen; Ulf Hodel, Engen; Gregor Rotzinger, Singen-Friedingen, all of Germany

[73] Assignee: Alusuisse Technology & Management Ltd., Switzerland

[21] Appl. No.: 778,951

[22] Filed: Jan. 6, 1997

[30] Foreign Application Priority Data

Feb. 5, 1996 [DE] Germany ............... 196 03 853.7

[51] Int. Cl.[6] .................................................. B21C 23/00
[52] U.S. Cl. .............................................. 72/255; 72/372
[58] Field of Search ........................... 72/254, 255, 257, 72/270, 272, 273, 273.5, 372

[56] References Cited

U.S. PATENT DOCUMENTS

| 4,165,625 | 8/1979 | Wagner et al. | 72/254 |
| 4,793,170 | 12/1988 | Daniels | 72/255 |

FOREIGN PATENT DOCUMENTS

| 57-154313 | 9/1982 | Japan | 72/254 |
| 4-251610 | 9/1992 | Japan | 72/272 |
| 5-131214 | 5/1993 | Japan | 72/255 |
| 5-261429 | 10/1993 | Japan | 72/255 |
| 6-71334 | 3/1994 | Japan | 72/255 |
| 1807900 | 4/1993 | U.S.S.R. | 72/254 |

Primary Examiner—Lowell A. Larson
Assistant Examiner—Ed Tolan
Attorney, Agent, or Firm—Bachman & LaPointe, P.C.

[57] ABSTRACT

A process for extruding a section or the like body from an ingot is such that an ingot is introduced into a bore of a container and, by means of an extrusion stem, is fed in the direction of extrusion into a shape-giving opening in a die. Before the ingot enters the die opening, it is pushed out of the container by an amount corresponding to the width (t) of a collar whereupon a disk-shaped slice is sheared off the free end of the ingot and removed. The free end of the ingot is then pushed onto the die opening. In order to carry out this process a shearing tool is provided after the end of the container facing the die and a moveable shearing blade positioned over that entrance to the container bore The disk-shaped slice should preferably be sheared away together with a residual butt of the previously extruded ingot which faces away from the die. To that end a shearing tool with two shearing blades is provided and can be moved radially with respect to the longitudinal axis (A) of the container bore.

16 Claims, 5 Drawing Sheets

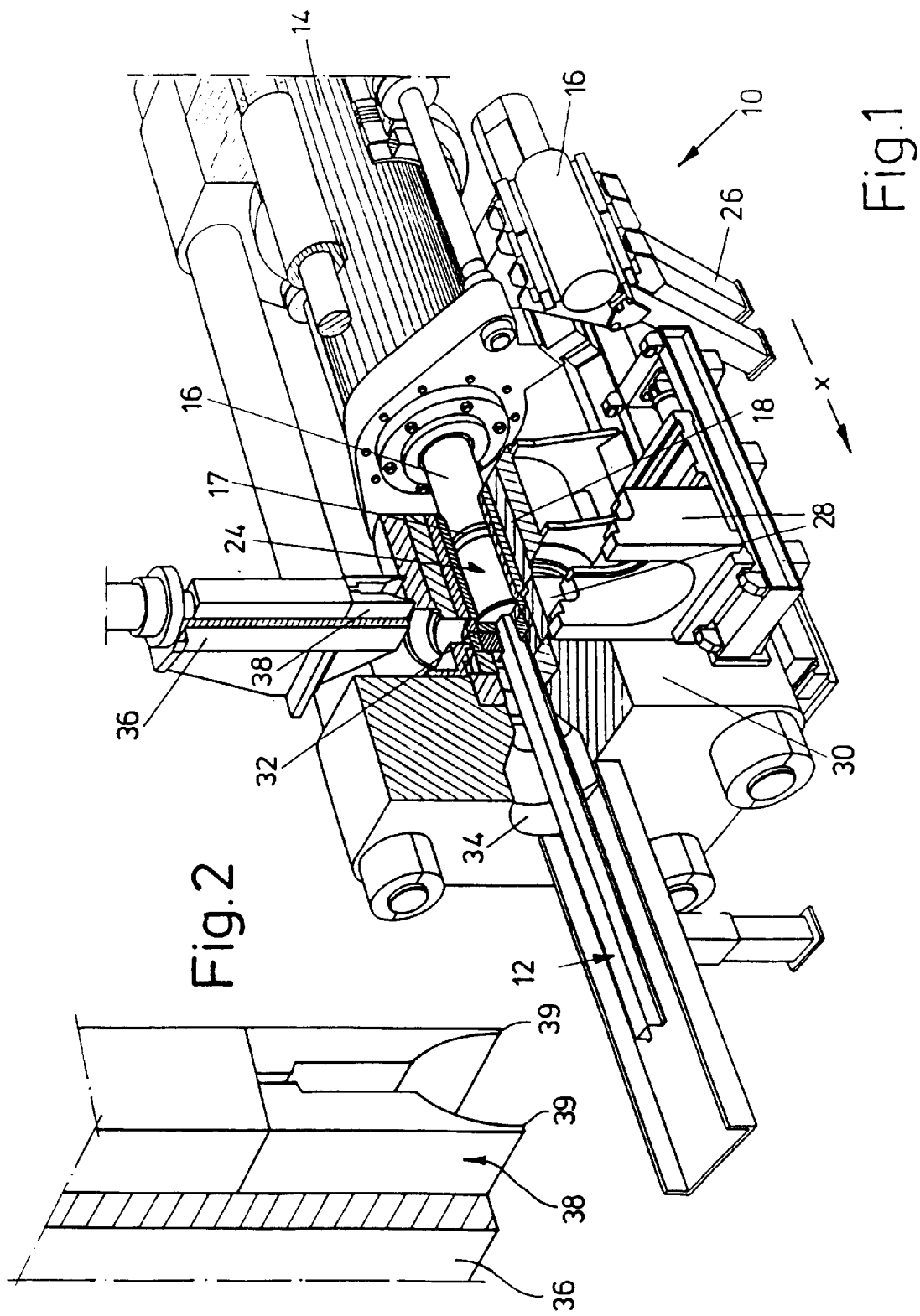

PROCESS FOR EXTRUDING A SECTION OR THE LIKE FROM AN INGOT AND A DEVICE THAT PURPOSE

BACKGROUND OF THE INVENTION

The invention relates to a process for extruding a section or the like from an ingot which is introduced into the bore of a container and, by means of an extrusion stem, fed in the direction of extrusion into a shape-giving opening in a die. Furthermore, the invention also relates to a device which is specially suited for that purpose.

During the extrusion process a material which is in a ductile state, with regard to metals, materials such as non-ferrous metals, sintered metals or steel but in particular an aluminum alloy, a heated ingot or rolled length of material is pressed in the direction of extrusion by means of an extrusion stem, or in the case of hydrostatic extrusion, by a fluid, through one or more openings in a die. In the case of direct or forward extrusion the stem moves in the direction of the die opening, in the same direction as the resultant section. In indirect or backward extrusion the material is moved counter to the direction of movement of the stem, through a die which is mounted on the hollow stem.

When, in the case of direct extrusion, the end of the stem has reached the die, a so-called ingot butt, which is of more or less inferior quality material, is left at the back of the die i.e. between it and the stem. This butt is normally removed by a shearing tool, which can move radially with respect to the die, before the next ingot can be pushed into the container and onto the die face by the stem, which in the meantime has been withdrawn, thus enabling the actual extrusion process to continue.

Metal ingots, especially ingots of aluminum alloys, are coated with contaminants, for example residual lubricant, and an oxide layer. Experience shows that the oxide particles on the end of the ingot are extremely detrimental when they become incorporated in the resultant section; the zone of contaminating oxide inclusions in the section is relatively long, depending on the shape of the section and the extrusion speed. Consequently, as quality requirements are increasing, manufacturers are forced to scrap increasingly longer lengths of section. The result is diminished output and lower cost efficiency. Numerous attempts have been made to eliminate this problem but without success.

SUMMARY OF THE INVENTION

In view of the above the object of the present invention is to eliminate the contamination zone arising between two neighboring ingots or billets, in particular when extruding aluminum alloys.

That objective is achieved by way of the invention.

In accordance with the invention, before the front end of the ingot enters the die opening, the ingot is first compressed and pushed a small distance, e.g. 10 mm, out of the container in the direction of extrusion; following this, a disk-shaped slice is sheared away from the free end of the ingot and removed. The free end of the ingot is then advanced to the die opening or to the rear end of the section being produced.

By removing this front part of the ingot the oxide layer there is also removed, with the result that, on the condition that the now virgin ingot end is rapidly advanced to the die, there is no fear of contamination by oxide particles nor of having to sacrifice extended lengths of section.

In order to eliminate any delay between the shearing process and the continuation of the extrusion process, the removal of the ingot end should take place at the same time as the normal shearing of the ingot butt on the die face. To that end the die and the container should be moved away from each other along their common axis after an ingot has been extruded; when their neighboring ends have been fixed together, the shearing of the ingot butt and the ingot end can then take place.

Of particular importance, and according to the invention, is the shearing of the new ingot face on extruding a section, the cross-section of which is at least partially larger than that of the ingot itself Using the so-called spreader technique a large and wide section is extruded from an ingot of small diameter, whereby the material from the ingot is spread out in cross-section in a pre-die chamber before entering the actual die opening; this spreading of the material takes place in predetermined regions, if desired, accompanied by narrowing within that cross-sectional contour to create a narrow cross-section also.

The device according to the invention by means of which the process of the invention may be carried out, is characterized in that a shearing tool is provided at the end of the container facing the die; the blade of the shearing tool, or a suitable means of separation, can be passed over the exit from the container bore. In that connection it is advantageous for the container, which is moveable along its axis, to be fixed at the radial line of displacement of the shearing tool.

As already mentioned, the time between removing the ingot end facing the die and advancing the sheared ingot face to the end of the section being produced should be kept as short as possible. In order to achieve this, it should be possible to fix the distance between the neighboring end faces of container and die; in the resultant gap of exactly predetermined width a shear with two blades is activated, simultaneously removing the residual butt of the extruded ingot and the front end of the next ingot. These slices of ingot may be returned for remelting, the harmful oxide particles removed and the material reused for production purposes.

According to another feature of the invention the distance between the two shearing blades is adjustable; any deviation from the intended gap size, determined e.g. by monitoring with a laser beam, can then be corrected.

A means for guiding the shearing facility may usefully be provided on the front face of the container, especially when a conventional, ring-shaped length of container sleeve projects out of the container bore. According to the invention the pre-die chamber, situated upstream of the die for the purposes of extruding an aluminum ingot using the so-called spreader method, increases in size from the diameter of the container bore to the die opening at least in one plane running in the direction of extrusion which is defined by an axis running transverse to the direction of extrusion.

In one version of this pre-die chamber its cross-section tapers in the direction on both sides of another axis which crosses the first axis. In this region the amount of material required is less than that offered by the ingot being extruded; the excess material is diverted to the other axis.

It has been found to be particularly favorable to arrange both axes perpendicular to one another and to arrange them as lines of symmetry; as a result, the distribution of the excess material is uniform.

BRIEF DESCRIPTION OF THE PREFERRED EMBODIMENTS

Further advantages, features and details of the invention are revealed in the following description of preferred exemplified embodiments and with the aid of the drawings which show in FIG. 1: a perspective view of part of an extrusion press with horizontal stem;

FIG. 2: an enlarged view of part of FIG. 1;

FIG. 3: a longitudinal section through a sketched container with stem upstream and the die tool downstream, both with respect to the direction of extrusion;

FIG. 4, 5: the representation shown in FIG. 3 but with container and stem in different positions;

FIG. 6, 7: different versions of shearing facilities situated between the container and the die tool;

FIG. 8: a part of an enlarged side elevation of a die tool with pre-die chamber for extruding using so-called spreader technology;

FIG. 9: a sketch of the, with respect to the extrusion direction, pre-die chamber complete with die opening;

FIG. 10, 11 cross-section through the pre-die chamber along line Q and line M in FIG. 9;

FIG. 12 a sketch of the theoretical surface for material flow in the die.

DETAILED DESCRIPTION

Figure 3:
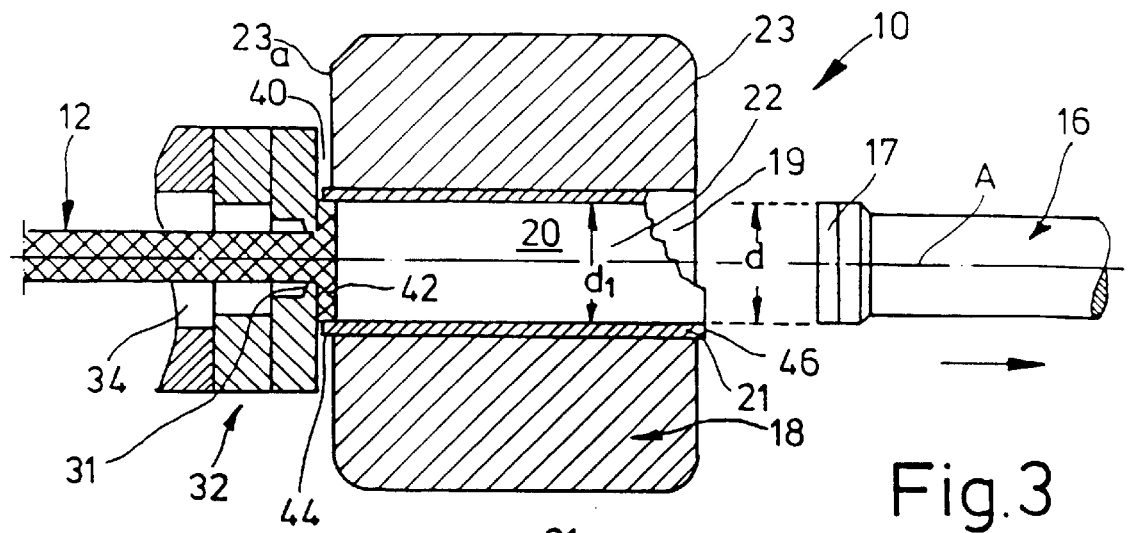
Figure 4:
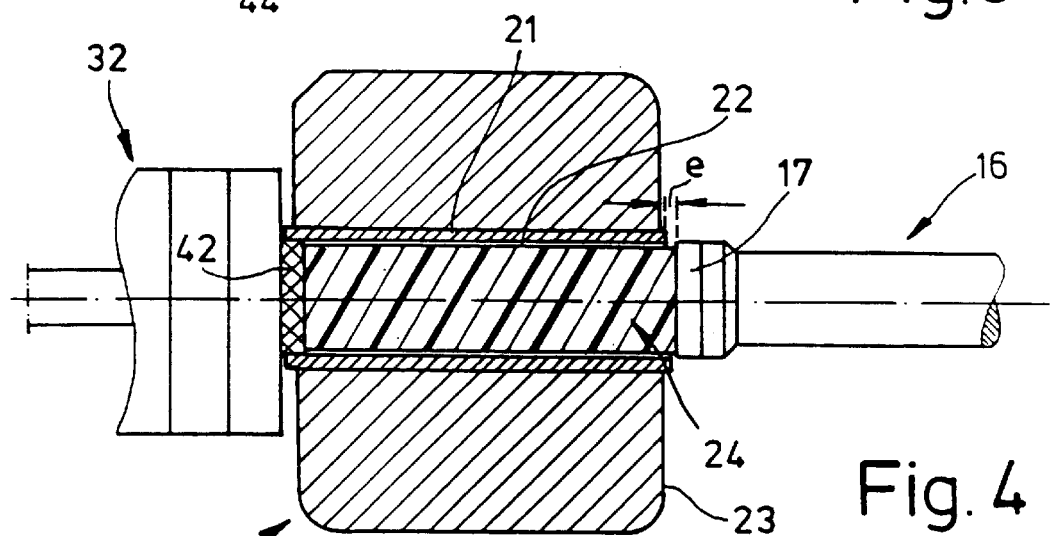

An extrusion press 10 for direct extrusion of sections 12 features, as shown in FIG. 1, on a main cylinder 14, a pressing stem 16 which lies along the longitudinal axis A of the bore 19 running through a container 18. The diameter d of a dummy block 17 at the free end face of the stem 16 is slightly smaller than the free bore diameter $d_1$ with the result that the stem 16 is able to penetrate the container bore. The mentioned bore diameter $d_1$ is delimited by the inner surface 20 of a sleeve 21 inserted in the container 18 or its bore 19. In the following the space inside this sleeve 21 is called the container bore 22.

The maximum distance between a front 23 of the container and the dummy block 17 in the inactive position of the stem 16, which is not shown here, is such that a billet or ingot 24 of light weight metal, in particular of preheated aluminum alloy, can be aligned by means of a loader 26 in front of the container bore 22 and pushed in the direction of extrusion x by the stem 16 into the container bore 22.

Close to a container end face $23_a$ remote from the stem 16, is the shape-giving die 32 resting in a die holder 28 on an extrusion platen 30. With respect to the direction of extrusion x this is followed by a run-out channel 34 in the platen 30 through which the resulting section 12 with the shape endowed by the contour 31 of the die 32 is removed.

Above the end face $23_a$ of the container is, as shown in FIG. 1, a jacking system 36 for a shearing facility 38 which moves radially to a gap 40 between the container 18 and the die 32.

At the end of the extrusion process, shown in FIG. 3, a so-called ingot butt 42 forms at the end of the container bore 22 away from the stem 16. In FIG. 2 the dummy block 17 has been drawn back from the ingot butt 42. As a result of a collar 44 formed by the projecting length of the container sleeve 21, the die face 33 remains a distance from the front end $23_a$ of the container. Also at the rear container end 23 the container bore 22 surrounds a ring-shaped collar 46 which acts as a projecting length of the container sleeve 21.

On inserting a new ingot 24 the free end of the ingot butt 42 is e.g. about 80 mm thick. The back end distance e of ingot material 24 amounts to, at most, 20 mm.

Figure 5:
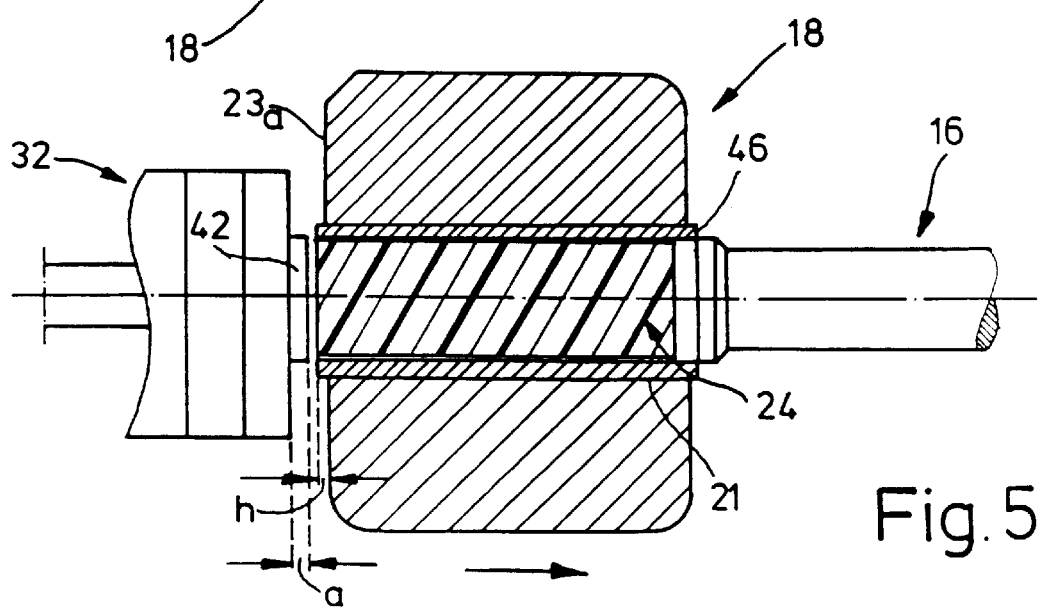

The container 18 is then drawn back until the butt 42 is standing free (FIG. 5). If the ingot 24, as shown in FIG. 6, projects out a collar length t of about 10 mm beyond the collar 44, then compressed by the stem 16; it should then not be possible for the ingot 24 to be displaced by the shearing tool 38 as a result of a subsequent shearing step which is still to be described.

Before the shearing process takes place, the container 18 is drawn counter to the direction of extrusion x until the rear face 33 of the die or of the die 32 itself is a distance n from the end face $23_a$ of the container 18. The container 18 and the die 32 are temporarily fixed in this position.

Figure 6:
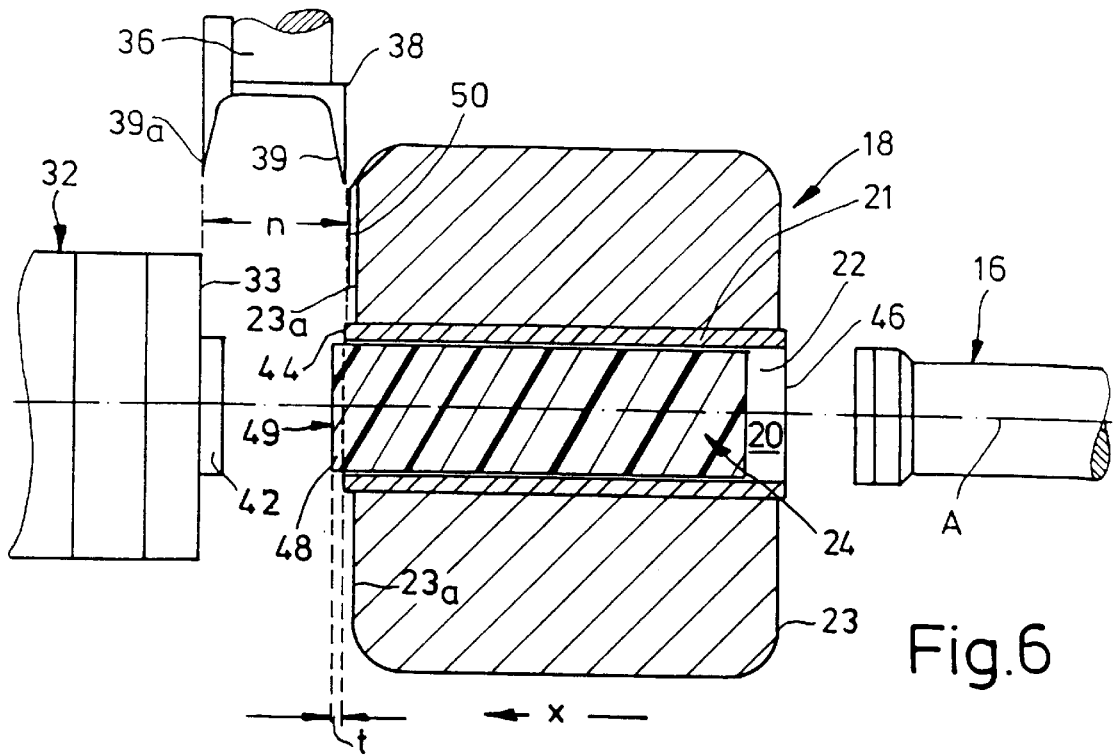

By lowering a pair of shearing blades 39, $39_a$ of the shearing tool 38, as shown in FIG. 6, the butt 42 and an end slice 48 of projecting length t of ingot 24 are removed simultaneously, and with that the end face 49 at the downstream end of the ingot 24; prior to the mentioned shearing step an oxide layer had formed at the end face 49, the oxide particles of which would have created undesirable impurities in the resultant section 12 had they not been removed.

In order to insure accurate alignment of the shearing tool 38, vertical alignment strips 50 are provided on the end face $23_a$ of the container 18 above the collar 44; the thickness of the alignment strips 50 corresponds to the thickness h of the collar 44.

Figure 7:
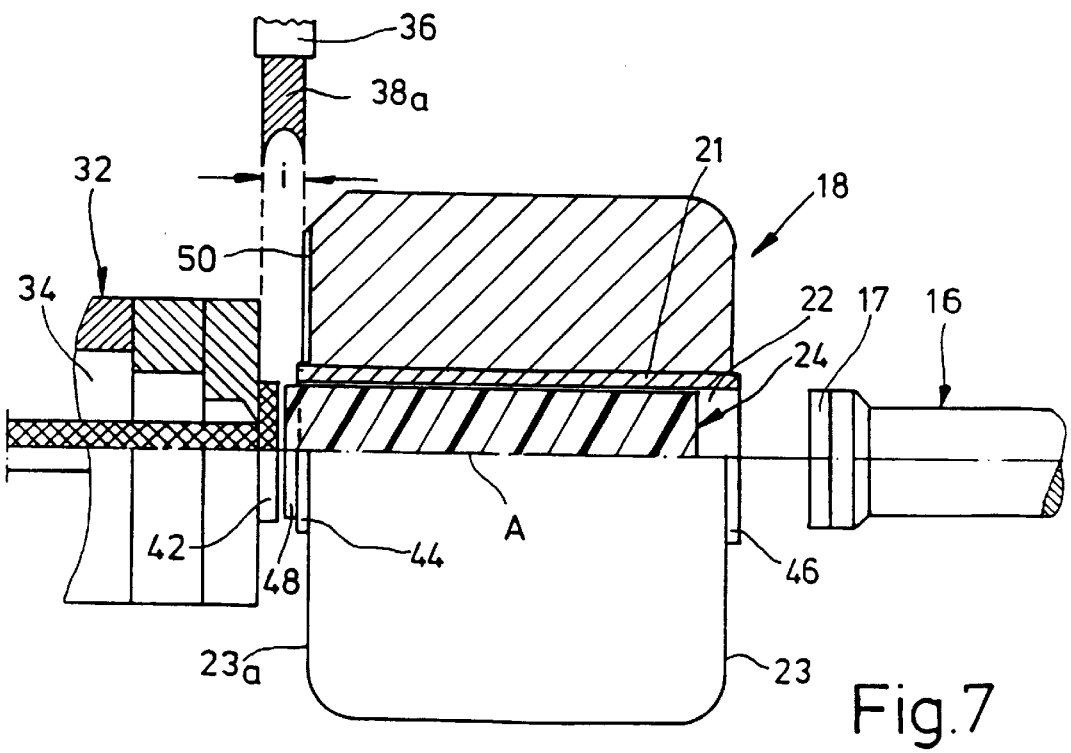

In the version shown in FIG. 7 the butt 42 and the ingot end face 49 remain close to each other so that the width i of the shearing blade $38_a$ may be kept very small. As a result, the distance between the new, oxide-free ingot end and the section end simultaneously separated from the ingot butt 42 is extremely short.

After the shearing operation the container 18 is again moved towards the die 32 and the extrusion process can begin again from the start.

Figure 9:
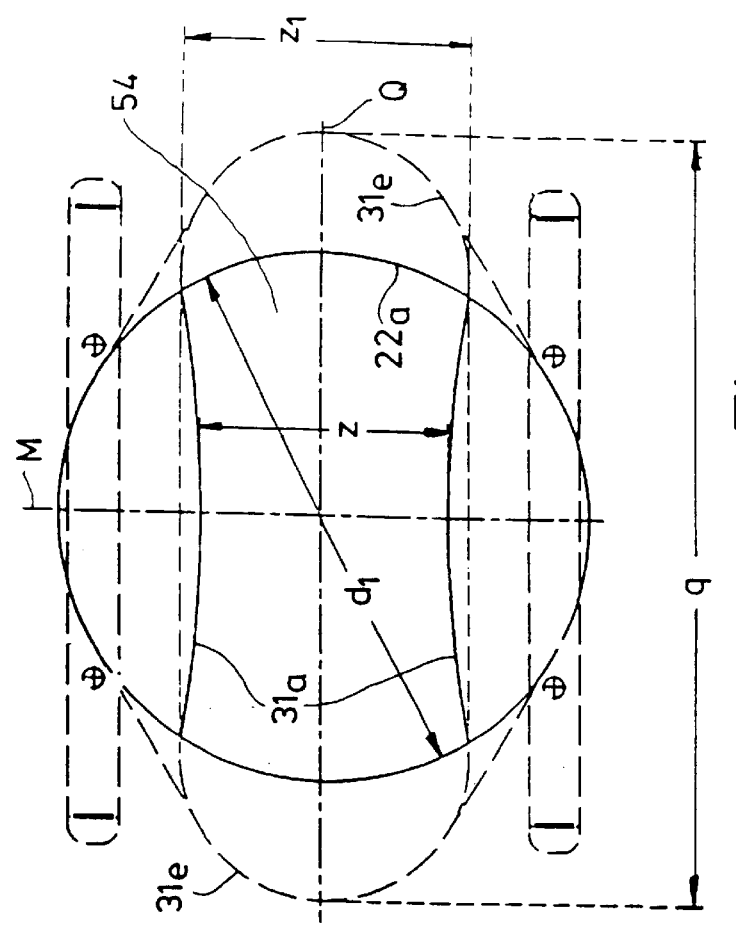
Figure 8:
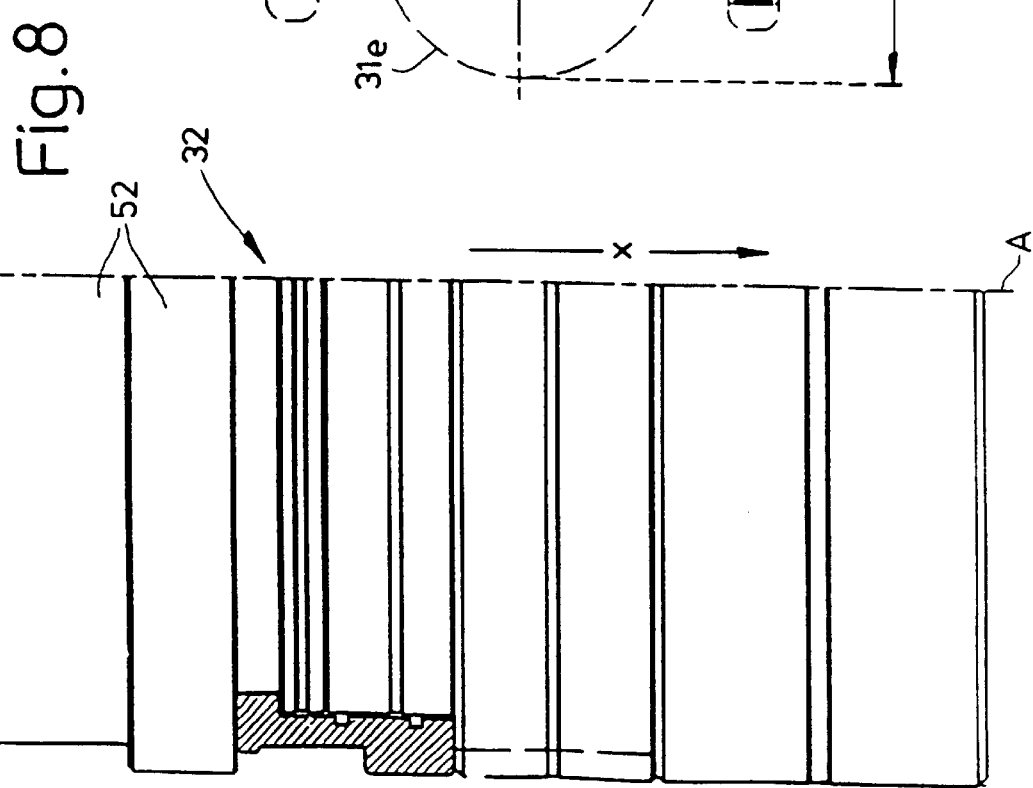

As viewed in the direction of extrusion x, the die 32 according to the version shown in FIG. 8 features a die ring 52 with an axial length b of 270 mm forming a pre-die chamber 54 into which the ductile ingot material is introduced and from there into the, here, slit-shaped opening 31a the horizontal longitudinal dimension q of which is e.g. at 750 mm significantly larger than the bore diameter $d_1$ of 520 mm. The height z of the die opening 31a in which a central plane in the direction of extrusion x of a determining vertical central axis M measures only 240 mm. From the central axis M, which, as does the transverse axis q to it, represents a line of symmetry, the die opening 31e increases in dimension on both sides to 280 mm as the largest height $z_1$. The latter is shown in FIG. 9 as defined by the contour $22_a$ of the container bore 22 from the two points of intersection of the longitudinal contours $31_a$ of die opening 31e. Outside thereof the end contour of the die opening 31e is partially circular in shape.

Figure 11:
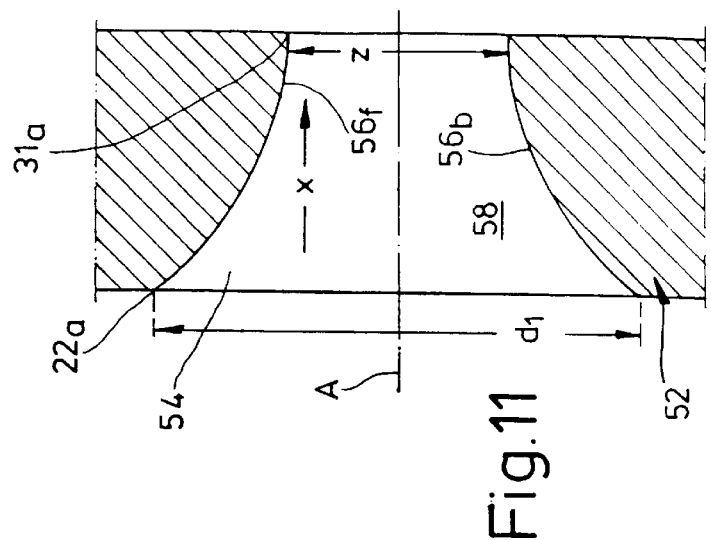
Figure 10:
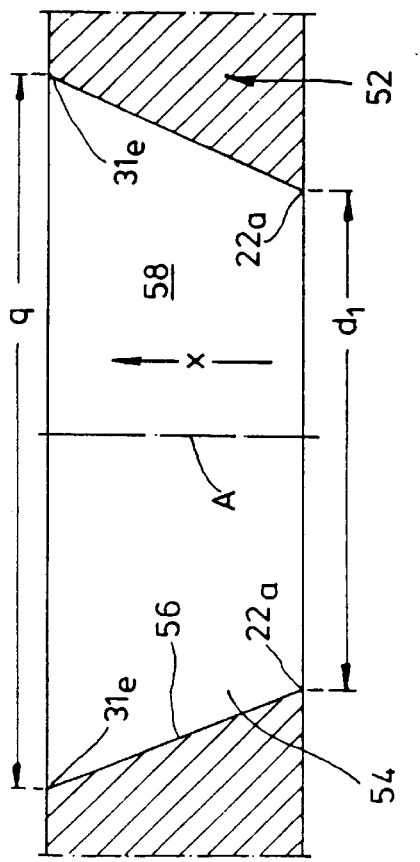
Figure 12:
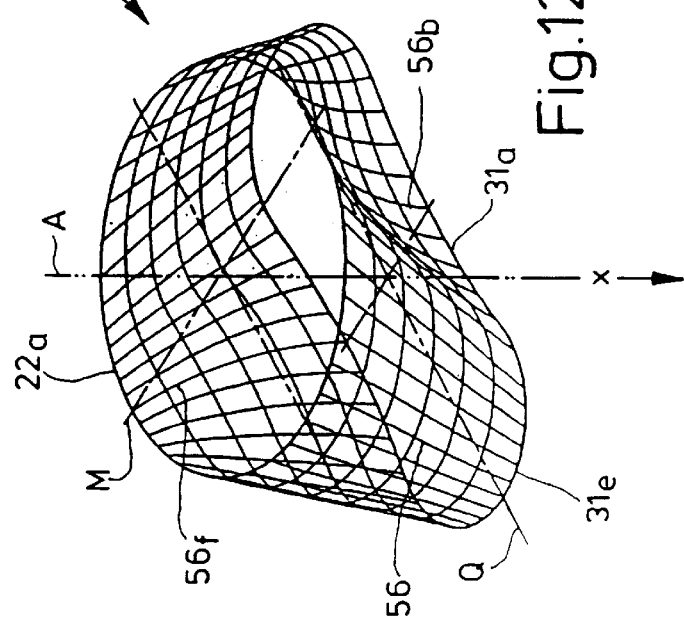

The contour 56 at the side of the chamber wall 58, as shown in FIG. 10, is a straight line connecting the contour $22_a$ of the container bore 22; the curved, part-circle-shaped base contour $56_b$ and the counter-facing curved roof contour 56f delimit, as shown in FIG. 11, a cone which tapers towards the die opening 31e. The three-dimensional shape of the chamber wall 58 is illustrated by the surface 60 shown in FIG. 12.

Creating large, wide sections 12 from a relatively narrow container bore 22 is achieved by means of the so-called spreader technique. Using the latter method and thanks to the pre-die chamber 54, it is possible to manufacture such sections from round containers 18 using dies 32 designed for rectangular containers.

We claim:

1. Process for extruding a section or the like from an ingot, which comprises: introducing an ingot into the bore of a container; feeding said ingot by means of an extrusion stem in the direction of extrusion into a shape-giving opening in a die; wherein before the ingot enters the die opening, it is pushed in the direction of extrusion leaving a free front end of said ingot extending out of the container to a degree amounting to the width of a collar, whereupon a slice of the free front end of the ingot is sheared off and removed, followed by introducing the ingot into the die opening.

2. Process according to claim 1, wherein before the shearing process takes place the container and shaping die are moved away from each other along their common axis and their neighboring end faces temporarily fixed a given distance apart.

3. Process according to claim 1, wherein before entering the die opening, the ends of the ingot are deformed in the direction of the die.

4. Process according to claim 3, wherein before entering the die opening, the end of the ingot is widened in at least one plane running in the direction of extrusion and narrowed in at least one other plane running in the direction of extrusion and transverse to the first plane.

5. Device for extruding a section or the like body from an ingot having a free front end, which comprises: a container having a downstream container end and a bore therein with an upstream bore entrance, wherein the free front end of the ingot is introduced into the bore entrance and exits at the container end; a die downstream of the container having a shape-giving opening therein, with the container end facing the die opening, wherein the free front end of the ingot extends out of the container end before entering the die opening to a decree amounting to the width of a collar; an extrusion stem for feeding the ingot in the direction of extrusion (x) into the shape-giving opening in said die for the purpose of extrusion; a shearing tool provided after the end of the container facing the die; and a movable shearing blade means arranged over the container end operative to shear off a slice of the free front end of the ingot before said ingot is introduced into said die opening.

6. Device according to claim 5, wherein the end of the container is secured in a radial line of movement of the shearing blade.

7. Device according to claim 5, wherein the die and container are relatively movable in an axial direction with respect to each other, and wherein the distance (n) between the neighboring end faces of the die and the container are such that they can be adjusted and fixed.

8. Device according to claim 5, wherein the shearing tool features two shearing blades which are parallel to each other and are a distance (i) apart.

9. Device according to claim 5, including at least one alignment means for the shearing tool provided at the end of the container.

10. Device according to claim 9, including a collar of a container sleeve delimiting the container bore projecting out of the end of the container, wherein the front of the alignment means is flush with the edge of the collar.

11. Process for extruding a section or the like from an ingot, which comprises: introducing an ingot into the bore of a container; feeding said ingot by means of an extrusion stem in the direction of extrusion into a shape-giving opening in a die; wherein before the ingot enters the die opening, it is pushed in the direction of extrusion out of the container to a degree amounting to the width of a collar, whereupon a slice of the free end of the ingot is sheared off and removed, followed by introducing the ingot into the die opening, including the step of shearing off a residual ingot butt of an ingot which has been extruded and is on the surface of the die facing counter to the direction of extrusion, wherein the ingot butt and the slice of the free end of the ingot are sheared away simultaneously, and wherein said slice is disk shaped.

12. Process according to claim 11, wherein the end of the ingot is brought into contact with the end of the residual ingot in the die immediately after the shearing process.

13. Device for extruding a section or the like body from an ingot, which comprises: a container having a container end and a bore therein, wherein the ingot is introduced into the bore and exits at the container end; a die downstream of the container having a shape-giving opening therein, with the container end facing the die opening; an extrusion stem for feeding the ingot in the direction of extrusion (x) into the shape-giving opening in said die for the purpose of extrusion; a shearing tool provided after the end of the container facing the die; and a movable shearing blade means arranged over the container end, wherein the shearing tool features two shearing blades which are parallel to each other and are a distance (i) apart, and wherein the distance (i) between the shearing blades is adjustable.

14. Device for extruding a section or the like body from an ingot, which comprises: a container having a container end and a bore therein, wherein the ingot is introduced into the bore and exits at the container end; a die downstream of the container having a shape-giving opening therein, with the container end facing the die opening; an extrusion stem for feeding the ingot in the direction of extrusion (x) into the shape-giving opening in said die for the purpose of extrusion; a shearing tool provided after the end of the container facing the die; and a movable shearing blade means arranged over the container end, including a pre-chamber provided between the container and the die which widens from the diameter (d1) of the container bore towards the die opening at least in one plane (Q) running in the direction of extrusion (x).

15. Device according to claim 14, wherein the cross-section of the pre-die chamber tapers in a central plane (M) lying transverse to said at least one plane (Q) and running in the direction of extrusion (x).

16. Device according to claim 14, wherein the central plane (M) penetrates the container bore along the longitudinal axis (A) and the transverse plane (Q) at right angles, both planes forming planes of symmetry for the wall of the pre-die chamber.

* * * * *